United States Patent
Davydov

(10) Patent No.: US 10,523,285 B2
(45) Date of Patent: Dec. 31, 2019

(54) FULL DIMENSION MULTIPLE INPUT MULTIPLE OUTPUT COMMUNICATION SYSTEMS AND METHODS

(71) Applicant: INTEL CORPORATION, Santa Clara, CA (US)

(72) Inventor: Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/765,695

(22) PCT Filed: Apr. 1, 2016

(86) PCT No.: PCT/US2016/025711
§ 371 (c)(1),
(2) Date: Apr. 3, 2018

(87) PCT Pub. No.: WO2017/078785
PCT Pub. Date: May 11, 2017

(65) Prior Publication Data
US 2019/0089423 A1 Mar. 21, 2019

Related U.S. Application Data

(60) Provisional application No. 62/251,621, filed on Nov. 5, 2015.

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/0478* (2013.01); *H04B 7/063* (2013.01);
(Continued)

(58) Field of Classification Search
CPC .... H04B 7/0417; H04B 7/0478; H04B 7/063; H04B 7/0647; H04B 7/0695; H04L 5/005; H04L 5/0094
See application file for complete search history.

(56) References Cited

U.S. PATENT DOCUMENTS

2013/0156001 A1 6/2013 Gomadam
2014/0376464 A1* 12/2014 Nam ................... H04B 7/0639
370/329

FOREIGN PATENT DOCUMENTS

EP 2677671 A1 12/2013

OTHER PUBLICATIONS

International Search Report and Written Opinion for International Patent Application No. PCT/US2016/025711 dated Jul. 13, 2016; 14 pages.

(Continued)

*Primary Examiner* — Kabir A Timory
(74) *Attorney, Agent, or Firm* — Schwabe, Williamson & Wyatt, P.C.

(57) ABSTRACT

Apparatuses and methods are disclosed for supporting a UE in reporting of a selection of an NZP CSI-RS resource to an eNB supporting FD-MIMO communication. Each NZP CSI-RS resource is associated with a unique NZP CRI (or 'Beam Index') on a given serving cell. The UE may select an NZP CSI-RS resource for CSI calculation and reporting to the eNB based on processed CSI-RS signals received at an antenna of the UE from the eNB of a serving cell of the UE based on a CSI-RS resource configuration for the UE signaled from the eNB. The UE may report a CRI and a CSI of the selected NZP CSI-RS resource to the eNB of the serving cell of the UE based on a CRI reporting configuration of the UE signaled from the eNB.

24 Claims, 9 Drawing Sheets

(51) Int. Cl.
H04B 7/0456 (2017.01)
H04B 7/06 (2006.01)
H04L 5/00 (2006.01)

(52) U.S. Cl.
CPC ......... *H04B 7/0647* (2013.01); *H04B 7/0695* (2013.01); *H04L 5/005* (2013.01); *H04L 5/0094* (2013.01)

(56) References Cited

OTHER PUBLICATIONS

European Patent Office; Office Action issued for Patent Application No. 16716410.2 dated Feb. 25, 2019; 7 pages.
Samsung; "BI and PMI reporting for class B," 3GPP TSG RAN WG1 Meeting #82bis, R1-155505, Agenda Item: 7.2.4.3.2; Malmo, Sweden, Oct. 5-9, 2015; 5 pages.
Catt, et al.; "WF on CSI reporting Class B," 3GPP TSG-RAN1 #82bis, R1-156147, Malmo, Sweden, Oct. 5-9, 2015; 6 pages.
3GPP TS 36.213 V12.7.0 (Sep. 2015); "Technical Specification Group Radio Access Network; Evolved Universal Terrestrial Radio Access (E-UTRA); Physical layer procedures (Release 12)," 241 pages.

\* cited by examiner

| $I^{BI}$ | $\beta^{BI}$ offset |
|---|---|
| 0 | 1.250 |
| 1 | 1.625 |
| 2 | 2.000 |
| 3 | 2.500 |
| 4 | 3.125 |
| 5 | 4.000 |
| 6 | 5.000 |
| 7 | 6.250 |
| 8 | 8.000 |
| 9 | 10.000 |
| 10 | 12.625 |
| 11 | 15.875 |
| 12 | 20.000 |
| 13 | reserved |
| 14 | reserved |
| 15 | reserved |

*Figure 6*

| $I_{BI}$ | Value of $M_{BI}$ | Value of $N_{OFFSET,BI}$ |
|---|---|---|
| $0 \leq I_{BI} \leq 160$ | 1 | $-I_{BI}$ |
| $161 \leq I_{BI} \leq 321$ | 2 | $-(I_{BI} - 161)$ |
| $322 \leq I_{BI} \leq 482$ | 4 | $-(I_{BI} - 322)$ |
| $483 \leq I_{BI} \leq 643$ | 8 | $-(I_{BI} - 483)$ |
| $644 \leq I_{BI} \leq 804$ | 16 | $-(I_{BI} - 644)$ |
| $805 \leq I_{BI} \leq 965$ | 32 | $-(I_{BI} - 805)$ |
| $966 \leq I_{BI} \leq 1023$ | Reserved | |

*Figure 8*

FULL DIMENSION MULTIPLE INPUT MULTIPLE OUTPUT COMMUNICATION SYSTEMS AND METHODS

CROSS REFERENCE TO RELATED APPLICATIONS

The present application is a national phase entry under 35 U.S.C. § 371 of International Application No. PCT/US2016/025711, filed Apr. 1, 2016, entitled "FULL DIMENSION MULTIPLE INPUT MULTIPLE OUTPUT COMMUNICATION SYSTEMS AND METHODS", which claims priority to U.S. Provisional Patent Application No. 62/251,621, filed Nov. 5, 2015, entitled "BEAM INDEX REPORTING FOR LTE," the entire disclosures of which are hereby incorporated by reference.

BACKGROUND

There is an ever increasing demand for network capacity as the number of wireless devices increases. With that increasing demand for capacity and increasing user equipment (UE) numbers comes a greater need for spectrum management, in terms of, for example, spectral efficiency and mitigating interference. Various techniques exist for increasing the traffic carrying capacity of a channel or cell. Those techniques comprise assigning subcarriers to specific user equipments, using multiple access techniques such as Orthogonal Frequency Division Multiple Access (OFDMA) and Single Carrier Frequency Division Multiple Access (SC-FDMA) in, for example, Long Term Evolution (LTE) and Long Term Evolution Advanced (LTE-A).

Other techniques also exist such as, for example, beamforming in which radio energy is transmitted in directional manner. A number of antennas can be arranged to produce a resulting beam pattern comprising lobes and nulls that can be used to improve signal to noise ratios and signal to noise plus interference ratios. Beamforming supports multi-user communications and, in particular, the antennas can be used to support multiple-input multiple output (MIMO) communications such as, for example, multi-user MIMO (MU-MIMO).

BRIEF DESCRIPTION OF THE DRAWINGS

Aspects, features and advantages of embodiments will become apparent from the following description given in reference to the appended drawings in which like numerals denote like elements and in which:

FIG. 6 shows a table mapping an offset;
FIG. 8 shows a table mapping a periodicity and an offset.

DETAILED DESCRIPTION

Figure 1:
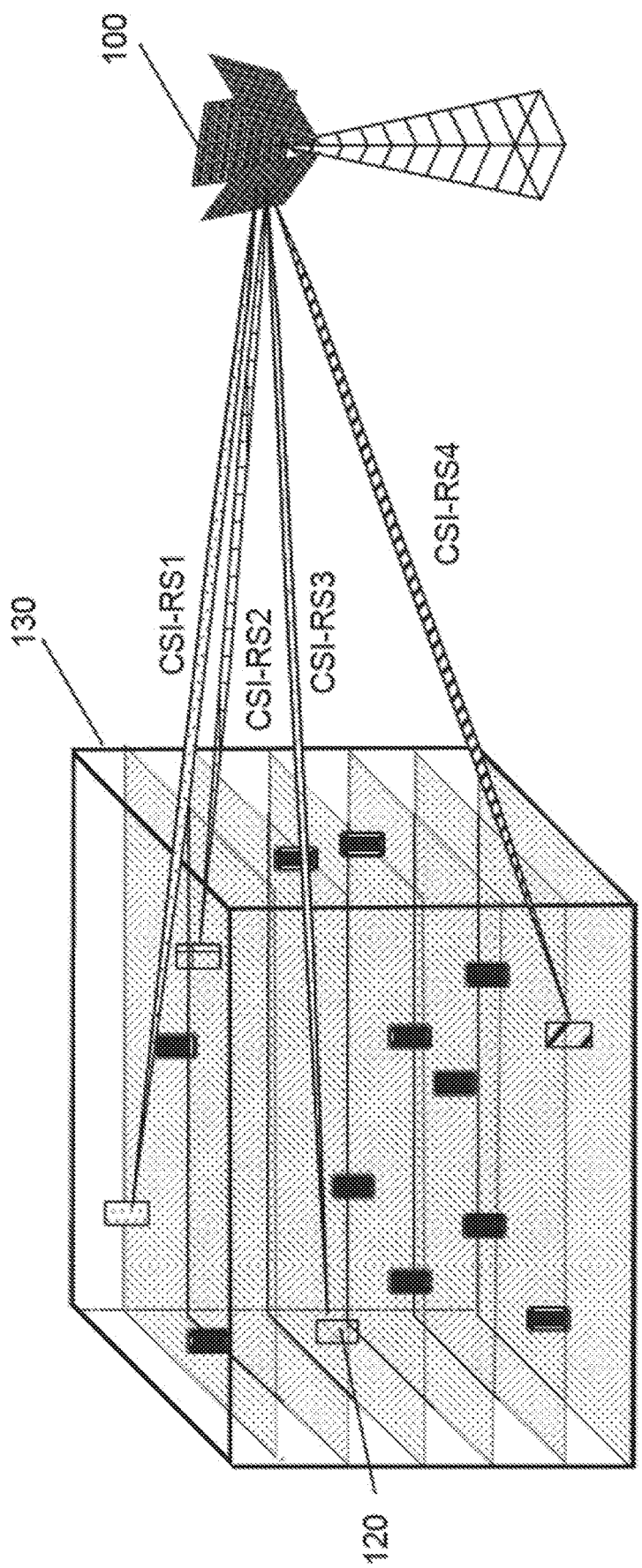
FIG. 1 illustrates an eNB and number of UEs.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the example embodiments. However, it will be apparent to those skilled in the art having the benefit of the present disclosure that the various aspects of the example embodiments may be practiced in other examples that depart from these specific details. In certain instances, descriptions of well-known devices, circuits, and methods are omitted so as not to obscure the description of the present example embodiments with unnecessary detail.

Elevation beamforming/Full Dimensional (FD) MIMO

Multiple input and multiple output (MIMO) systems are used to improve the robustness of data transmission and increase data rates. MIMO antennas operate by breaking high data rate signals into multiple lower data rate signals in transmit mode that are recombined at the receiver. A MIMO system typically consists of m transmit antennas and n receive antennas. In MIMO systems, a transmitter sends multiple streams by multiple transmit antennas. The transmit streams go through a matrix channel which consists of all m·n paths between the m transmit antennas at the transmitter and n receive antennas at the receiver. The receiver receives a signal y that results when the input signal vector x is multiplied by a transmission channel matrix H.

$$y = Hx$$

$$\text{where } H = \begin{bmatrix} h_{11} & h_{12} & h_{..} & h_{1m} \\ h_{21} & h_{22} & h_{..} & h_{2m} \\ h_{..} & h_{..} & h_{..} & h_{..m} \\ h_{n1} & h_{n2} & h_{n..} & h_{nm} \end{bmatrix}$$

The receiver gets the received signal vectors y by the multiple receive antennas and decodes the received signal vectors into the original information. Transmission matrix H contains the channel impulse responses hnm, which reference the channel between the transmit antenna m and the receive antenna n. Many MIMO algorithms are based on the analysis of transmission matrix H characteristics. The rank (of the channel matrix) defines the number of linearly independent—or orthogonal—rows or columns in H. It indicates how many independent data streams or "layers" can be transmitted simultaneously, which impacts the channel capacity of the transmission channel.

Beamforming uses multiple antennas to control the direction of a wavefront by appropriately weighting the magnitude and phase of individual antenna signals (transmit beamforming) to create a localized, directed, spatially selective beam through constructive interference, as opposed to an omnidirectional beam. An array gain (also called beamforming gain) is achieved because every single antenna in the array makes a contribution to the steered signal. Beamforming thus permits targeted illumination of specific areas, making it possible to improve transmission to users at the far reaches of cell coverage.

Various developments have been made to include in standards for wireless radio telecommunications released by the 3rd generation partnership project (3GPP) various MIMO and beamforming techniques to improve channel capacity and spectral efficiency for downlink. The different scenarios for transmission in the downlink are defined by a number of Transmission Modes (TMs). The transmission modes supporting MIMO and beamforming will now be briefly described.

In 3rd generation partnership project (3GPP) release 8 (Rel-8), multiple input and multiple output (MIMO) supporting beamforming based on the user-specific reference signals was introduced by which a base station, or eNodeB (eNB) in LTE, operating in Transmission Mode (TM) 7 (TM7) can operate a smart antenna to beamform its transmissions to specific UEs to take advantage of spatial multiplexing of downlink data to increase efficiency. Subsequent MIMO enhancements in release 9 (Rel-9), release 10 (Rel-10) and release 11 (Rel-11) added further transmission modes TM8, TM9 and TM10 respectively.

In TM9, Downlink Channel State Information Reference Signals (CSI-RS) and Demodulation Reference Signals (DMRS) were introduced supporting eight layer spatial multiplexing. In TM 9, and subsequently introduced transmission mode TM10, a UE-specific CSI-RS, transmitted by an eNB, is used by a UE to measure, calculate and report Channel State Information (CSI) as feedback to the eNB as Uplink Control Information (UCI) in a closed loop operation mode, from which the eNB configures the downlink for the UE.

In Rel-10 and Rel-11 CSI includes Channel Quality Indication (CQI) which indicates to the eNB a highest modulation and a code rate that can lead to an acceptable error rate in the channel, the Precoding Matrix Indicator (PMI) which indicates to the eNB a suitable precoding matrix for the mapping of the layers to the antennas of the eNB, which can maximize the retrieval of data bits across all the layers, and the Rank Indicator (RI) which indicates the channel rank or the number or layers and signal streams in the downlink MIMO transmission in which the channel capacity across the all the downlink channels can be maximized. The bit size of the RI report depends on the channel rank for the CSI-RS.

LTE Rel-8 to Rel-11 TM8, TM9 and TM10 are designed to support antenna configurations at the eNB that are capable of adaptation in azimuth. No support is provided in these specifications for beamforming in any direction other than azimuth.

In LTE Rel-13, a RAN1 work item relating to Full Dimension MIMO (FD-MIMO) has signaled interest in enhancing system performance through the use of antenna systems having a two-dimensional array structure that provides adaptive control over the azimuth dimension and also the elevation dimension.

The additional control over the elevation dimension of FD-MIMO enables a variety of strategies such as sector-specific elevation beamforming (e.g., adaptive control over the vertical pattern beamwidth and/or downtilt), advanced sectorization in the vertical domain, and user-specific elevation beamforming. Vertical sectorization can improve average system performance through the higher gain of the vertical sector patterns, but vertical sectorization generally does not need additional standardization support. User equipment (UE)-specific elevation beamforming offered by FD-MIMO promises to increase the signal-to-interference-plus-noise (SINR) statistics seen by the UEs by pointing the vertical antenna pattern in the direction of the UE while spraying less interference to adjacent sectors by virtue of being able to steer the transmitted energy in elevation. The effects of FD-MIMO will be particularly beneficial for urban settings where antenna are mounted below roof height.

Example embodiments disclose certain communications systems and methods for supporting FD-MIMO, particularly concerning the feedback from the UE to the eNB of a selection of a CSI-RS resource from among plural CSI-RS resources configured for the UE.

As shown in FIG. 1, to support FD-MIMO, an eNB 110 transmits multiple CSI-RS resources beamformed to have different elevations (e.g. as sectors) which are incident on, e.g. a building 130 in which a UE 120 of plural UEs is present. In the example, four CSI-RS resources are configured for the UE, CSI-RS1, CSI-RS2, CSI-RS3, CSI-RS4.

The configuration of the CSI-RS resources for the UE 120 is set by the eNB and signaled to the UE in Downlink Control Information (DCI). For FD-MIMO beamforming, two or more non-zero power (NZP) CSI-RS with Nk={1,2, 4,8} antenna ports are configured by the eNB for the UE. Up to eight CSI-RS can be configured for a UE. The eight antenna ports for the CSI-RS resources are referred to as antenna port 15 to antenna port 22.

Figure 2:
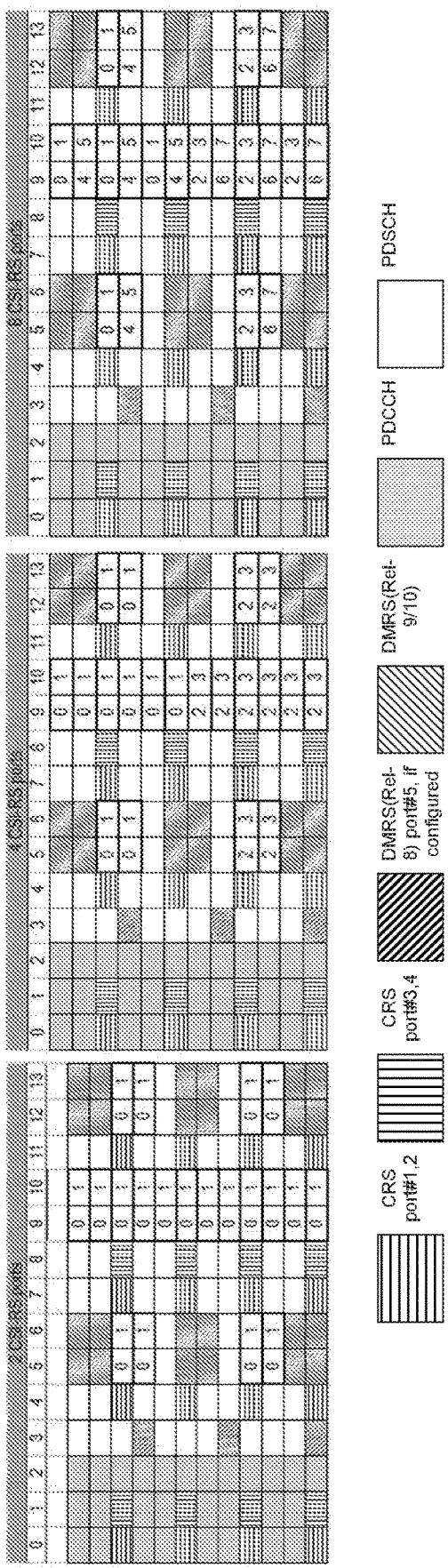
FIG. 2 shows a pattern for CSI-RS.

The CSI-RS are transmitted by the eNB in a single subframe at periodicities of at least every eighth frame, and up to twice every frame. FIG. 2 shows the pattern for the symbol positions of CSI-RS signals in a single subframe for 2, 4 and 8 CSI-RS, where ports 0-7 corresponds to CSI-RS ports 15-22 respectively. In each, the 40 resource elements carrying numbers representing the antenna ports indicate the reference symbols for CSI-RS allocation. As can be seen from FIG. 2, where two CSI-RS are configured, as shown in the leftmost pane a CSI-RS consists of two consecutive reference symbols (each indicated by ports 0 and 1 in consecutive resource elements), giving 20 possible CSI-RS configurations in a resource block pair. Where four CSI-RS are configured, as shown in the middle pane the CSI-RS are pair-wise multiplexed (with each configuration being indicated by dedicated ports 0 and 1 in consecutive resource elements and ports 3 and 4 in another pair of consecutive resource elements), giving 10 CSI-RS configurations. Similarly, where eight CSI-RS are configured, as shown in the rightmost pane there are 5 CSI-RS configurations (each carrying eight ports indicated as ports 0-7).

The CSI-RS structure for configurations where there are a different number of antenna ports for different CSI-RS resources has a nested structure, i.e. CSI-RS resources corresponding to the lower number of antenna ports is subset of CSI-RS resource of CSI-RS pattern corresponding to higher number of CSI-RS antenna ports. The parameters of CSI-RS are configured to the UE using higher layer signaling.

In embodiments, for supporting the reporting of the CRI in FD-MIMO, each NZP CSI-RS resource is associated with a unique NZP CSI-RS Resource Indication (CRI) (or 'Beam Index') on a given serving cell. A UE, based on channel measurement of the configured CSI-RS resources for that UE, selects one NZP CSI-RS resource and provides to the eNB as Uplink Control Information (UCI) CSI information (i.e. reports of RI, CQI and PMI) along with a report indicating the selected NZP CSI-RS resource (so called CSI-RS Resource Indicator (CRI), or otherwise known as "beam index" or "BI").

Given that CRI is a new type of uplink control information (UCI), and that there are dependencies between the CRI and CSI (i.e. RI, CQI and PMI), there are a number of considerations and challenges as to how the CRI and CSI should be reported in a robust and efficient manner that facilitates coding and decoding by the UE and eNB. The example embodiments thus provide systems and methods of CRI reporting considering both periodic and aperiodic CSI reporting schemes. The arrangement and processes for the operation of the UEs 120 and the eNB 110 for supporting the UE 120 in reporting of a selection of a NZP CSI-RS resource to the eNB 110 supporting Full Dimension Multiple Input Multiple Output (FD-MIMO) communication in accordance with the example embodiments will be described in detail below. Firstly, the components of the eNodeB and the UE will be described with respect to FIGS. 3 and 4.

Figure 3:
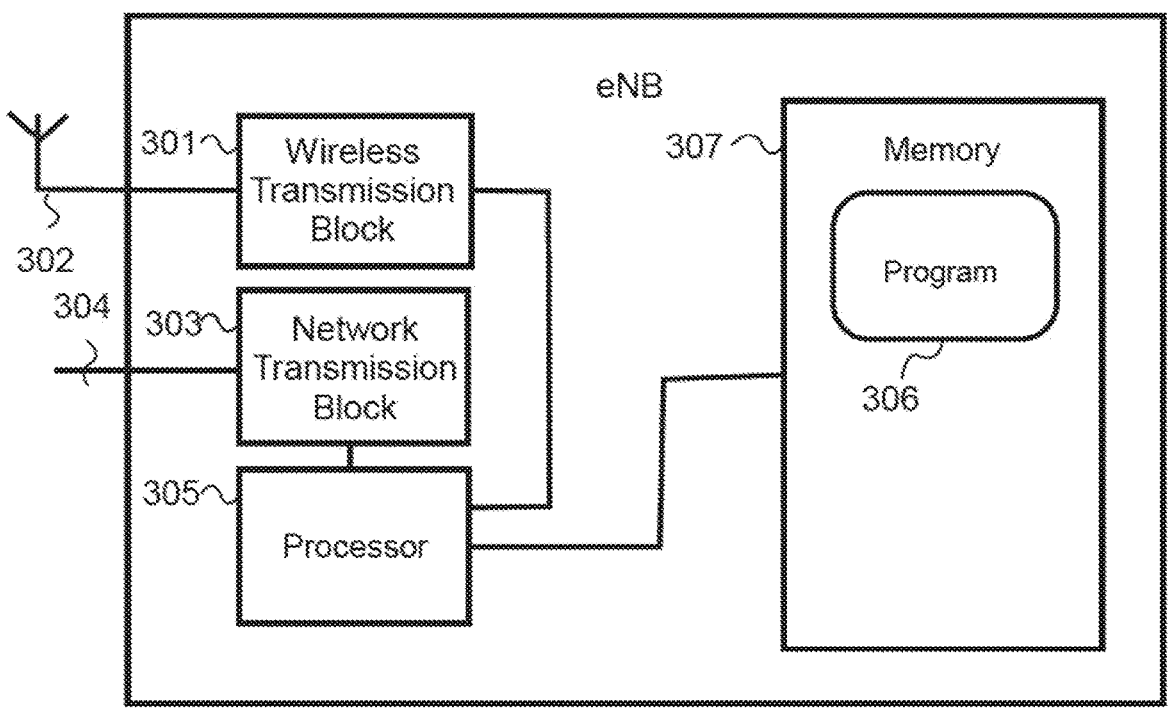
FIG. 3 is schematic block diagram illustrating an eNB.

FIG. 3 illustrates for one embodiment, example components of an eNB, for example, eNB 110 in FIG. 1. The eNB comprises a wireless transmission block 301 for communicating wirelessly with UEs such as, for example, smartphones, and portable devices described with respect to FIG. 1. The transmission block 301 has an associated antenna 302 and may have a number of antennas for multiple-input and multiple-output (MIMO) operation. A network transmission block 303 may be provided, which supports network communications such as communication with, for example, the components of the core network (not shown) 110 or any other network entity. The eNB can comprise, therefore, a network connection 304 such as, for example, the communication link with the core network. A processor 305 is provided for controlling overall operations of the eNB. The processor 305 can comprise a number of processors, and/or one or more multi-core processors. The processor 305 operates in accordance with software 306 stored within a processor readable, or processor accessible, memory or storage 307. The software 306 is arranged so that the eNB can implement the examples described herein, and, in particular, can implement the eNB aspects of the apparatuses and methods described herein. The memory 307 may store data and software defining routines for implementing sensing, inter-cell interference coordination (ICIC), mobility, access control, radio resource management (RRM) and scheduler functions. The memory 307 may also comprise elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. The memory/storage may include any combination of suitable volatile memory and/or non-volatile memory. In some embodiments wireless transmission block 301 of the eNB can be in included a separate device.

Figure 4:
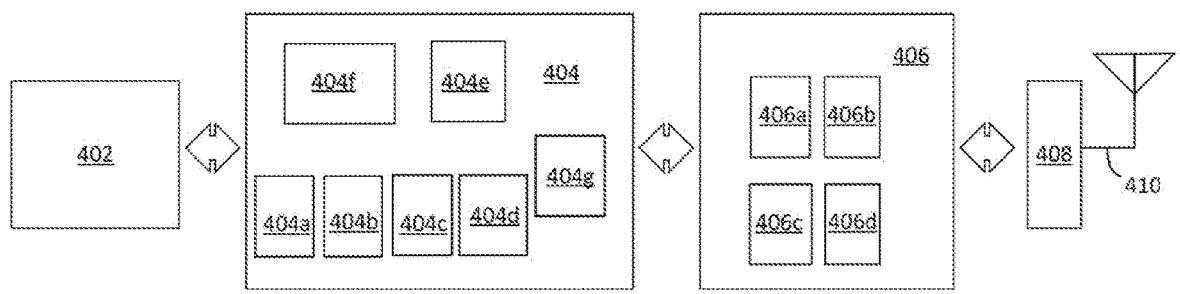
FIG. 4 is a schematic block diagram illustrating a UE.

FIG. 4 illustrates, for one embodiment, example components of an electronic device. In embodiments, the electronic device may be, implement, be incorporated into, or otherwise be a part of a UE, an evolved NodeB (eNB), or some other electronic device. It may, for example, be a UE 120 or eNB 110 of FIG. 1. In some embodiments, the electronic device may include application circuitry 402, baseband circuitry 404, radio frequency (RF) circuitry 406, front-end module (FEM) circuitry 408 and one or more antennas 410, coupled together at least as shown.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406.

Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may include elements for compression/decompression and echo cancellation and may include other suitable processing elements in other embodiments. The baseband circuitry 404 may further include memory/storage 404g. The memory/storage 404g may be used to load and store data and/or instructions for operations performed by the processors of the baseband circuitry 304. Memory/storage for one embodiment may include any combination of suitable volatile memory and/or non-volatile memory. The memory/storage 404g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 404g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410.

In some embodiments, the electronic device 130 may include additional elements such as, for example, memory/storage, display, camera, sensor, and/or input/output (I/O) interface.

When the electronic device of FIG. 4 is an UE, the circuitry may be operable to communicate with an eNB via an uplink and downlink radio interface. In some embodiments, the electronic device of FIG. 4 may be configured to perform one or more methods, processes, and/or techniques as described herein, or portions thereof. The electronic device may implement the examples described herein, and, in particular, can implement the UE aspects of the flowcharts and flow diagrams described herein.

Although an embodiment of an eNB has been described with respect to FIG. 3 and an embodiment of a UE has been described with respect to FIG. 4, FIG. 4 may alternatively illustrate, for one embodiment, example components of an eNB or some other electronic device in the system 100.

Embodiments to enabling mechanisms for UEs to select CSI-RS resources configured for the UE and transmitted by the eNB, and for reporting the selected CRI and the related CSI will now be described in more detail. Two overarching mechanisms for CRI reporting will be described, with a number of embodiments thereof, aperiodic reporting and periodic reporting. In various embodiments the UE may comprise circuitry to report the CRI in according with the mechanisms of periodic and/or aperiodic reporting described herein The LTE protocol stacks used by the UE and/or eNB are divided into a number of system operation layers and the different layers, as will be known by the person skilled in the art, are referred to in places herein to describe examples of how processes, mechanisms and techniques can be implemented. However, it will be appreciated that other implementations are possible and corresponding layers and protocols in future 3GPP networks may be used in implementations based on those future 3GPP networks. Moreover, examples of computer program instructions and data stored in memory of the UE and the eNB will be described with respect to FIG. 5 to illustrate how some processes, mechanisms and techniques can be implemented. However, it will be appreciated that these are just examples and other implementations and alternatively arrangements of data and instructions are contemplated.

CSI-RS Resource Indicator (CRI) Reporting

Figure 5:
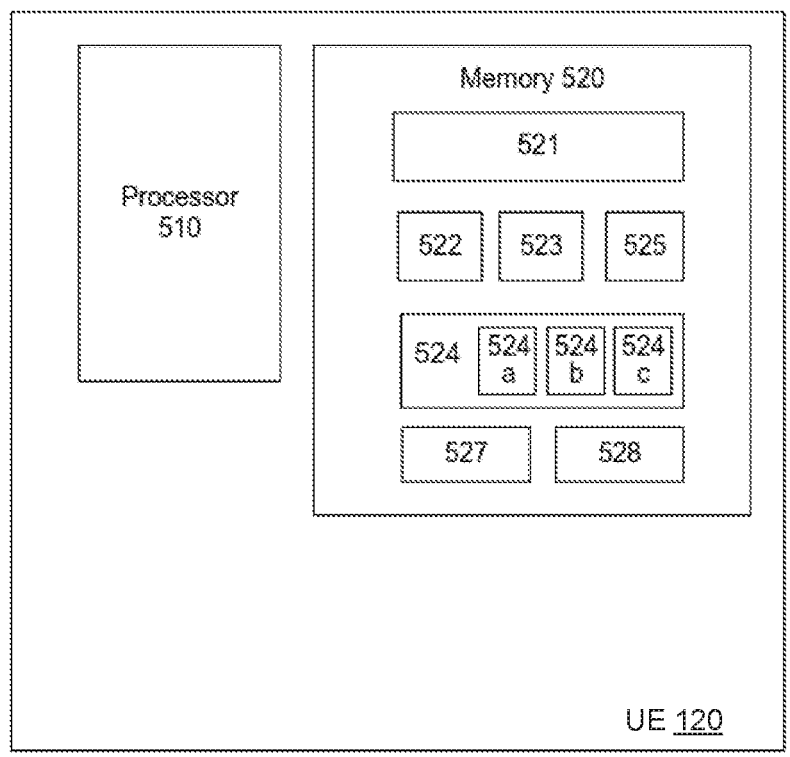
FIG. 5 is a schematic block diagram illustrating some parts of the UE in more detail.

In more detail, with reference to FIG. 5, circuitry 500 of a smart phone or other UE is shown. FIG. 5 provides another schematic view of selected parts of the UE. The circuitry comprising processing circuitry 510 and memory 520 for storing data and programs for implementing some of the processes and mechanisms according to embodiments described herein is schematically shown. The processing circuitry 510 may, for example, comprise one or more of the processors of the application circuitry 402 and one or more of the processors 404a to 404f of the baseband circuitry 404 of FIG. 4. The memory 520 may, for example, comprise some of the memory or storage in the application circuitry 402 and some of the memory or storage 404g of the baseband circuitry 404. The memory may include any combination of suitable volatile memory and/or non-volatile memory, including, but not limited to, read-only memory (ROM), random access memory, cache, buffers, etc. The memory may be shared among various processors of the processing circuitry or dedicated to particular processors. The processing circuitry 510 is coupled to, and can control, transceiver circuitry (not shown in FIG. 5) provided by the RF circuitry 406 and FEM circuitry 408 shown in FIG. 4. The transceiver circuitry may also include parts of the baseband circuitry and application circuitry of FIG. 4.

The memory 520 may store a plurality of applications 521. Data may be transmitted by the applications via the baseband circuitry 404, RF circuitry 406, FEM circuitry 408 and the antenna 410 to the eNB. Correspondingly, data for the application may be received from the eNB 120 via the antenna 410 and passed to the application via the FEM circuitry 408, RF circuitry 406 and baseband circuitry 404. The memory may further store CSI-RS configuration data 522, CRI reporting configuration data 523 and CSI report 524, including a Rank Indicator 524a, channel quality indicator (CQI) 524b and precoding matrix indicator (PMI) 524c. The memory may also store CRI report 525 about the selection of the CSI-RS resource by the UE.

The CSI-RS configuration data 522 may include a list of parameters and other indicators signaled to the UE 120 by the eNB 110 in a DCI message. The CSI-RS configuration data 522 may cause the UE to monitor specific CSI-RS for CRI selection and CSI calculation. The CRI reporting configuration data 523 may also include a list of parameters and other indicators, at least some of which may be signaled to the UE 120 by the eNB 110 in a DCI message. The CRI reporting configuration data 523 may interact with one or more applications 521 or other software, firmware or hardware of the device to cause UE to report the CRI (and also CSI) in accordance with one or more embodiments described herein. The CSI report 524 and CRI report may store data for sending back to the eNB 110 in a UCI message for use by the eNB in configuring the downlink for the UE for FD-MIMO. In some implementations, some but not all of these values are stored in memory.

Figure 9:
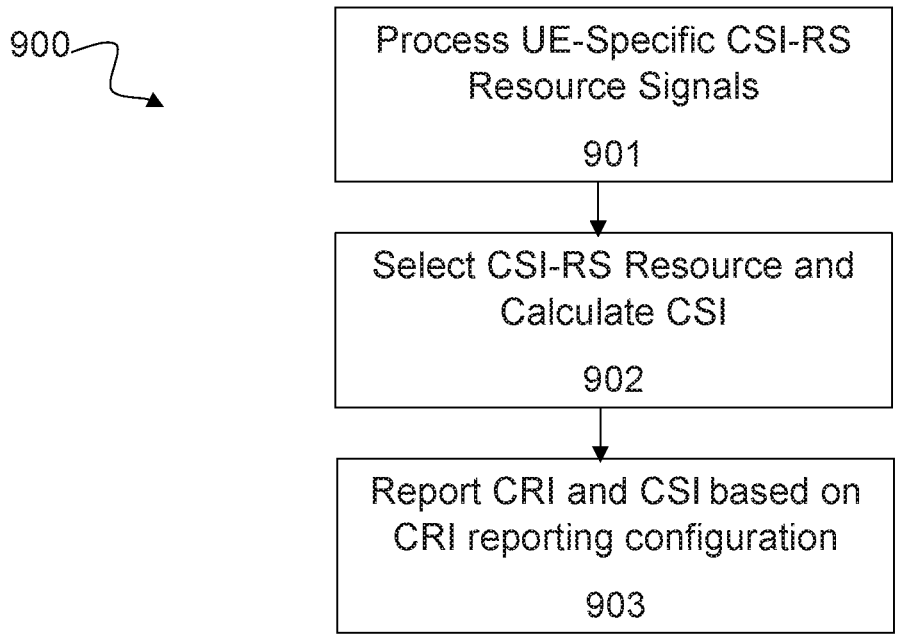
FIG. 9 depicts a flow diagram of processing operations associated with CRI reporting in a UE.

A process 900 in a UE for CRI reporting to an eNB will now be described with respect to FIG. 9. An application 521 may configure the UE to implement the process 800. The UE processes 901 CSI-RS signals received at an antenna of the UE from the eNB of a serving cell of the UE based on a CSI-RS resource configuration for the UE which may be stored at CSI-RS configuration data 522. The CSI-RS configuration data 522 may be signaled from the eNB. In the CSI-RS configuration, two or more NZP CSI-RS resources are configured for the UE and each NZP CSI-RS resource is associated with a unique CRI on a given serving cell. The UE selects 902 an NZP CSI-RS resource for CSI calculation and reporting to the eNB based on the processing of the received CSI-RS signals. The UE reports 903 a CRI and a CSI of the selected NZP CSI-RS resource to the eNB of the serving cell of the UE based on a CRI reporting configuration of the UE signaled from the eNB which may be stored at CRI reporting configuration data 523.

Figure 10:
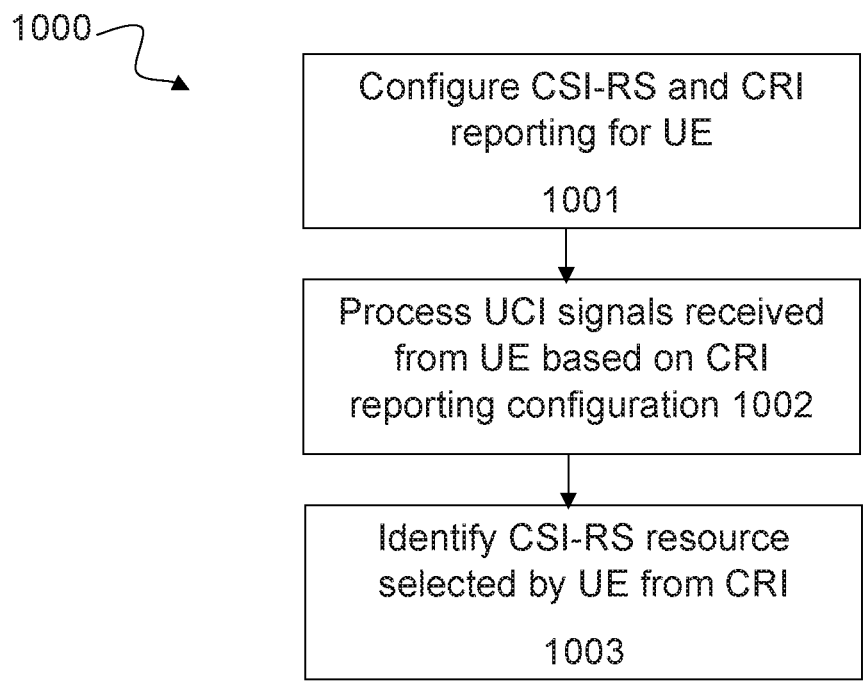
FIG. 10 depicts a flow diagram of processing operations associated with CRI reporting in an eNB.

A process 1000 in an eNB for CRI reporting from a UE will now be described with respect to FIG. 10. The eNB process 1000 may be a counterpart to the UE process 900. The eNB configures 1001 a CSI-RS configuration and CRI reporting parameters for the UE. In particular, the eNB may configure for signaling to a UE CSI-RS configuration parameters for the UE to configure the UE for processing signals from two or more NZP CSI-RS with Nk={1,2,4,8} antenna ports at the UE, wherein each NZP CSI-RS resource is associated with a unique CRI on the serving cell of the eNB. In addition, the eNB may configure for signaling to the UE CRI reporting configuration parameters for the UE to configure the UE for reporting the CRI in an uplink physical channel. The eNB then processes signals, which may include UCI, received at an antenna of the eNB in the uplink physical channel from the UE based on the CRI reporting parameters. By this processing, a CRI report from the UE may be recovered. The eNB identifies 1003 a CSI-RS resource selected by the UE based on the recovered CRI report.

In this way, from the CRI and CSI reported from the UE, the eNB may configure the downlink for the UE.

Embodiments of configurations for the CRI reporting by the eNB and the UE and aspects of the CRI reporting by the UE to the eNB in accordance with those embodiments will now be described for aperiodic CRI and CSI reporting, and periodic CRI and CSI reporting, with reference to FIGS. 6 to 8.

Aperiodic CRI and CSI Reporting

In these embodiments, the UE has circuitry to configure the CRI reporting configuration of the UE for aperiodic reporting of the CRI and CSI on physical uplink shared channel (PUSCH) based on CRI reporting configuration parameters signaled from the eNB. The UE may operate in accordance with this embodiment at least in part based on the CRI reporting configuration parameters being set to certain value, which may be at least partly signaled by the eNB.

In one embodiment, the UE has circuitry to encode the CRI report jointly with a rank index (RI) report or with a channel quality indicator (CQI) report/precoding matrix indicator (PMI) report. UCI reporting on a physical uplink shared channel (PUSCH) uses separate channel coding and resource element mapping for RI and CQI/PMI reports. Support of the separate coding is required to resolve the possible ambiguity on the CQI/PMI payload size that in general case depends on the reported RI value. Given that the CQI/PMI decoding is conditioned on the decoding result of the RI report, the RI reporting is typically made more robust comparing to the CQI/PMI. For the design of the CRI reporting procedures on PUSCH similar issues of the UCI dependency needs to be considered. More specifically, the number of antenna ports Nk for the K configured NZP CSI-RS resources may be different. In this case, UE following the existing procedures for determination of the RI payload size based on the minimum between the number of configured CSI-RS antenna ports and MIMO capability of the UE, may have similar impact of the CRI report on the RI payload size (RI bit width). For example, for a given CRI the corresponding NZP CSI-RS resource may have the number of antenna ports different from the number of antenna ports of another NZP CSI-RS resource corresponding to another CRI value. As the result for class B CSI reporting with K>1 a variable RI payload size may be observed depending on the reported CRI value.

In view of this, in this embodiment, joint coding between CRI and RI or between CRI and CQI/PMI may be used. The ambiguity in the RI report payload may occur and the following options may resolve it:

The all configured NZP CSI-RS resources are restricted in RAN1 specification to have the same number of antenna ports Nk.{1,2,4,8}. and/or The RI report payload size is determined based on the maximum number of antenna ports across all configured NZP CSI-RS resources and MIMO capability of the UE. In this embodiment, RI report payload size is determined based on the maximum number of antenna ports across all configured NZP CSI-RS resources and MIMO capability of the UE. This avoids ambiguity in the RI report payload, at least. The unused bits in the RI report may be set to fixed values (e.g., 0) to improve the decoding performance. In this way, the eNB may decode the RI report more reliably leading to a robust CRI reporting and downlink configuration system.

By using one of the alternatives above the dependency between CRI and RI reporting can be avoided as the RI report bit width is uniquely determined by a single value.

In another embodiment for aperiodic reporting of CRI, CRI is independently encoded from RI and CQI/PMI. In this case the CRI should be reported on the same SC-FDMA symbols regardless whether the RI report is present or not, unless 1 CSI-RS antenna port is used on all NZP CSI-RS resources. In this embodiment, the channel coding procedure for the CRI with independent coding should follow the channel coding procedures of the RI for different payload sizes. To provide more robust transmission for CRI, a new parameter ICRI (also referred to below and in FIG. 6 as IBI) may be defined. ICRI may be used to control the amount of the coded bits for the CRI report. The parameter ICRI may be higher layer configured or determined from the IRI if the channel coding procedures for the CRI and RI reports are the same. For example, a fixed relation between IRI and ICRI offsets can be established in such way to provide slightly more robust transmission of the CRI comparing to the RI report, i.e. ICRI=min(12,IRI+Δ), where Δ is some integer value fixed in the specification (e.g., Δ=1).

Based on the ICR, the UE determines the βCRI (also referred to below and in FIG. 6 as βBI) offset from the table shown in FIG. 6, which shows the mapping of RI offset values and the index signalled by higher layers and is used to determine the number of coded bits QCRI (also referred to as QBI) for the CRI report.

For example, for UCI reporting on PUSCH without uplink shared channel (UL-SCH).

$$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right)$$

where O is the number of CRI indicator bits, $O_{CQI-MIN}$ is the number of CQI bits including CRC bits assuming rank equals to 1 for all serving cells for which an aperiodic CSI report is triggered, $M_{sc}^{PUSCH}$ is the scheduled bandwidth for PUSCH transmission in the current subframe expressed as a number of subcarriers in, and $N_{symb}^{PUSCH}$ is the number of SC-FDMA symbols in the current PUSCH transmission sub-frame given by $N_{symb}^{PUSCH}=(2 \cdot (N_{symb}^{UL}-1)-N_{SRS})$, where $N_{SRS}$ is equal to 1 if UE is configured to send PUSCH and sounding reference signal (SRS) in the same subframe for the current subframe, or if the PUSCH resource allocation for the current subframe even partially overlaps with the cell-specific SRS subframe and bandwidth configuration, or if the current subframe is a UE-specific type-1 SRS subframe, or if the current subframe is a UE-specific type-0 SRS subframe and the UE is configured with multiple TAGs. Otherwise $N_{SRS}$ is equal to 0. For beam indication, the number of coded bits $Q_{CRI}$ for the CRI report is given by: $Q_{BI}=Q_m \cdot Q^r$ and $[\beta_{offset}^{PUSCH}=\beta_{offset}^{BI}/\beta_{offset}^{CQI}]$.

Figure 7:
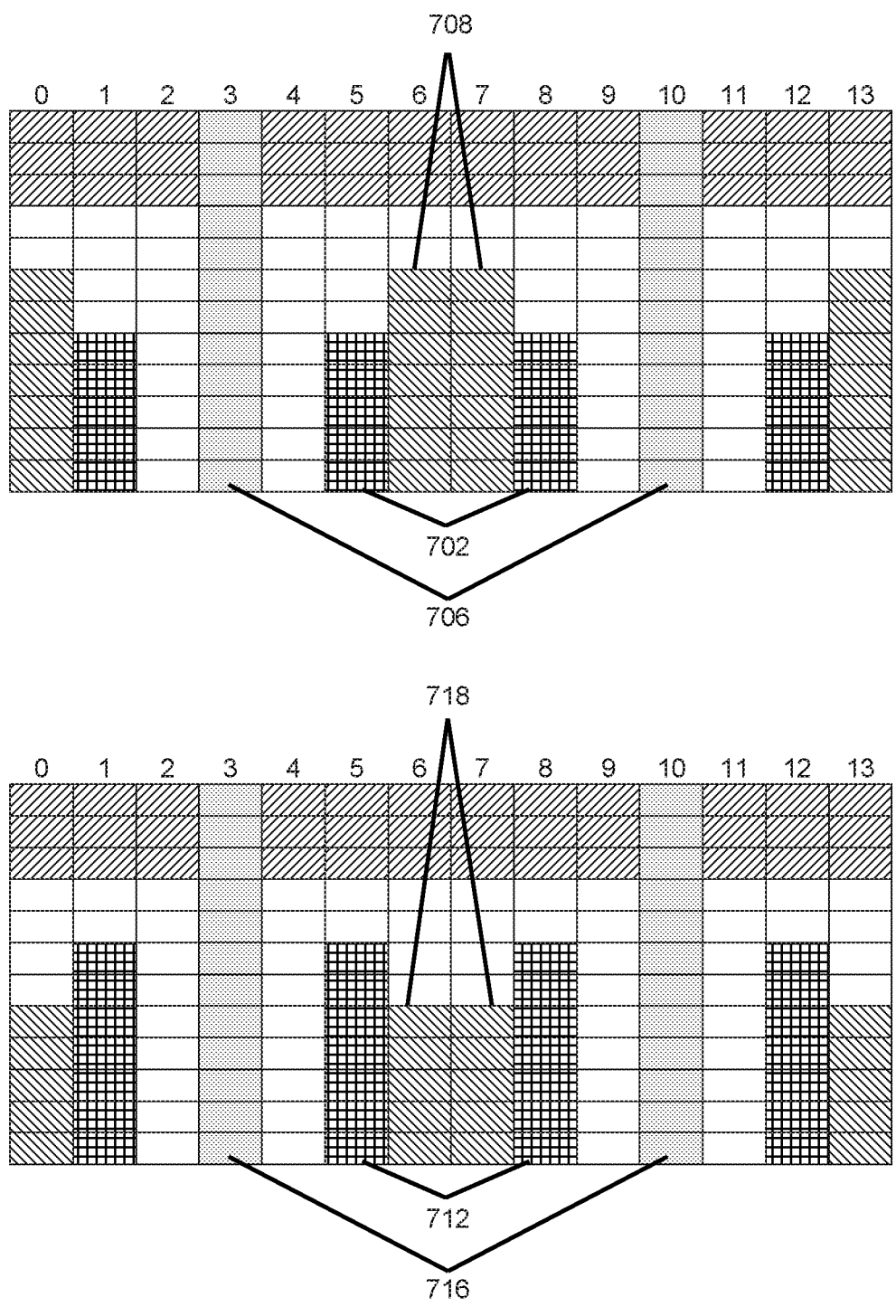
FIG. 7 shows a pattern for a CRI report.

In other embodiments, different reliability of the CRI transmission is achieved by using different resource element mapping on PUSCH for CRI using the two alternatives, as shown in FIG. 7:

FIG. 7, Left pane: CRI is mapped to single carrier (SC)-frequency-division multiple access (FDMA) symbols 702 which are closer to uplink demodulation reference signals (DM-RS) 706 than RI 708.

FIG. 7, Right pane: in another embodiment, CRI is mapped to SC-FDMA symbols 712 which are farther to uplink DM-RS 716 than RI 718.

In the first alternative where the CRI report is mapped to SC-FDMA symbols closer to uplink DM-RS than for RI report is following the design principle of UCI reporting on PUSCH, when the more important UCI information is transmitted closer to the DM-RS to reduce the impact of the channel estimation errors. In the second alternative, the resource element mapping for RI is the same as in Rel-12 and CRI is transmitted on the SC-FDMA symbols not used for any UCI transmission.

In another embodiment when NZP CSI-RS resource is configured with one antenna port, RI is not transmitted on PUSCH. In this case the CRI is mapped to SC-FDMA symbols of the RI report to provide the additional robustness. This embodiment is used only if the all NZP CSI-RS resource configured for the UE have single antenna port.

In other embodiments, the channel coding procedure for the CRI with independent coding should follow the channel coding procedures of the RI for different payload sizes.

In accordance with these embodiments, robust and reliable aperiodic reporting of CRI can be achieved.

Periodic CRI and CSI Reporting

In these embodiments, the UE has circuitry to configure the CRI reporting configuration of the UE for periodic reporting of the CRI and CSI on physical uplink control channel (PUCCH) based on CRI reporting configuration parameters signaled from the eNB. The UE may operate in accordance with this embodiment at least in part based on the CRI reporting configuration parameters being set to certain value, which may be at least partly signaled by the eNB.

In an embodiment where CRI and CSI are to be reported periodically, CRI is reported on PUCCH using a new CSI PUCCH reporting type, type 7, containing CRI only. This type of CSI PUCCH reporting supports CRI feedback only. The periodicity of the CRI report MCRI and offset NOFFSET,CRI are determined by the higher layer configured CRI-Config-Index parameter (ICRI) that indicates the periodicity of the CRI report and subframe offset in the units of the RI report periodicity. The table of FIG. 8 shows the Mapping of ICRI to MCRI and NOFFSET,CRI (referred to in FIG. 8 as IBI to MBI and NOFFSET,BI).

Similar to aperiodic CSI reporting, the payload size for RI may be determined based on the maximum number of antenna ports across all NZP CSI-RS resources. The payload size for RI is selected based on the maximum number of antenna ports across NZP CSI-RS resource. If NZP CSI-RS resource is configured with 1 CSI-RS antenna port RI-Config-Index is configured but may not be reported in this case. Thus, the periodicity and subframe offset for the RI is configured regardless of the number of antenna ports in NZP CSI-RS resource.

This allows the periodicity and subframe offset for CRI reporting to be determined even where RI may not be reported.

The reporting periodicity of the CRI is expected to be relatively long. Depending on the configuration of the CRI offset, there could be long period of time when the CRI report will not be provided to the eNB. Instead of skipping the RI and CQI/PMI reporting in the absence of the CRI report, in another embodiment, RI and CQI/PMI information may be reported for the default NZP CSI-RS resource, e.g., corresponding to the lowest CRI value or NZP CSI-RS index. Thus for the calculation of CQI/PMI conditioned on the last reported CRI, in the absence of a last reported CRI in this embodiment the UE shall conduct the RI and CQI/PMI calculation conditioned on the lowest possible CRI value. In another embodiment, the highest CRI index is used.

In embodiments, transmission mode (TM) 10 is considered configured the RI-reference CSI process to achieve CSI reporting of the same RI across two or more CSI processes. In the case where a RI-reference CSI process is used for class B CSI reporting with K>1 NZP CSI-RS resources, in embodiments, for CSI process and RI-reference CSI process all configured NZP CSI-RS resources for a given CSI process should have the same number of NZP CSI-RS resource antenna ports and the same set of the restricted RIs to support CSI reporting with RI-reference CSI process.

The RI Reference process CSIs may, for example, be associated with time periods where an interfering cell eNB, of the one or more eNBs, is operating in a blanking mode of a CoMP wireless network. In another embodiment, the RI Reference process CSIs may be associated with time periods where an interfering cell eNB, of the one or more eNBs, is operating in a non-blanking mode of a CoMP wireless network.

Figure 11:
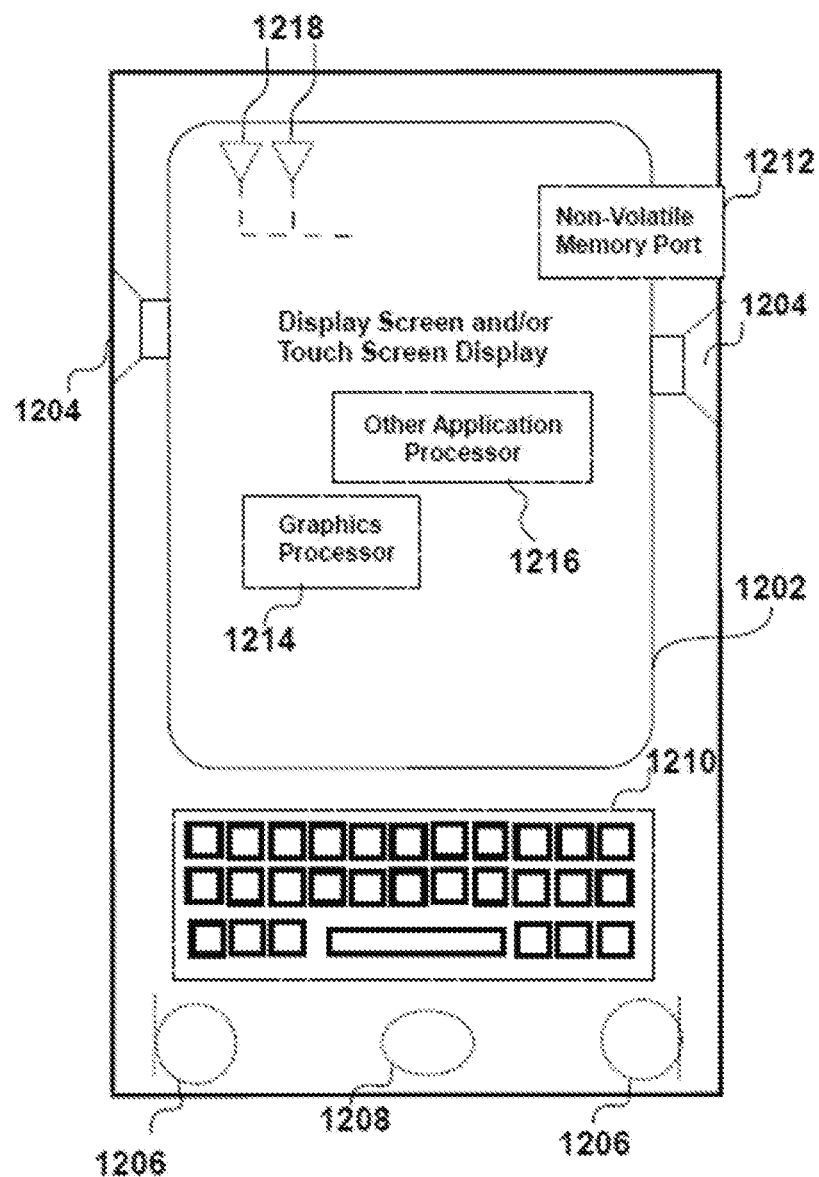
FIG. 11 a schematic block diagram illustrating some components of an UE.

It will be appreciated that the UE can be implemented in other ways than described with respect to FIGS. 4 and 5 and may comprise alternative or additional components. Additional components of a UE, which can be used in the network described herein, are shown in FIG. 11. For example, the UE may comprise one or more user interfaces, one or more peripheral component interfaces and one or more sensors. In various embodiments, user interfaces could include, but are not limited to, a display 1202 (e.g., a liquid crystal display, a touch screen display, etc.), a speaker 1204, a microphone 1206, one or more cameras 1208 (e.g., a still camera and/or a video camera), a flashlight (e.g., a light emitting diode flash), and a keyboard 1210, taken jointly or severally in any and all permutations. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may interact with a receiver chain of the UE to receive signals from components of a positioning network, e.g., a global navigation satellite system (GNSS). In various embodiments, the UE may be a computing device such as a mobile computing device. A mobile computer device may comprise but is not limited to, a laptop computing device, a tablet computing device, a netbook, a mobile phone, etc. In various embodiments, the UE may have more or fewer components, and/or different architectures. Additionally, the mobile device may comprise at least one or more of a memory port 1212 for receiving additional memory (not shown), a graphics processor 1214 and an application processor 1216, taken jointly and severally in any and all permutations. The mobile device can comprise one, or more than one, antenna 1218. The UE is illustrated as a mobile phone in FIG. 11 but the components described may also be implemented, although they may have a different position with respect to each other.

Although specific embodiments and implementations have been illustrated and described herein, it will be appreciated by those of ordinary skill in the art that a wide variety of alternate and/or equivalent embodiments or implementations designed to achieve the same purposes may be substituted for the specific embodiments and implementations shown and described, without departing from the scope of the present disclosure. This application is intended to cover any adaptations or variations of the embodiments discussed herein. Therefore, it is manifestly intended that the embodiments of the present disclosure be limited only by the claims and the equivalents thereof.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

It will be appreciated that although implementations of the eNB, the UE, and a signaling messages control parameters and commands have been described with respect to specific examples shown in the drawings other implementations are contemplated. It will be appreciated that although a base station in the network has been described as an eNodeB or eNB, the description is relevant to any base station that can implement the processes and methods described. In embodiments, the implemented wireless network may be a 3rd Generation Partnership Project's long term evolution (LTE) advanced wireless communication standard, which may include, but is not limited to releases 14, or later, of the 3GPP's LTE-A or LTE-Advanced Pro standards and beyond.

While embodiments are described with reference to an LTE network, some embodiments may be used with other types of wireless access networks, for example another wireless access network implementing a 3GPP wireless communication standard. The wireless access network may implement a next generation 3GPP wireless communication standard. In some implementations, the wireless network may be a 3rd Generation Partnership Project's Fifth Generation (5G) wireless network and implement a 3GPP 5G wireless communication standard.

Although the examples and embodiments have been described separately with respect to their accompanying drawings, embodiments are not limited thereto. Embodiments can be realized in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such enumerated list members are contemplated, which is made more emphatic by the accompanying language "taken jointly and severally in any and all permutations" or, where appropriate, "taken jointly and severally in any and all combinations".

Embodiments are also provided according to the following numbered clauses:

Example 1 may include a method of beam index reporting from a user equipment (UE), the method comprising:
configuring two or more non zero power (NZP) channel station information reference signals (CSI-RS) with $Nk=\{1, 2,4,8\}$ antenna ports at the UE, wherein each NZP CSI-RS resource is associated with an unique NZP CSI-RS index on a given serving cell;
configuring parameters associated with a beam index (BI) or NZP CSI-RS resource index reporting from the UE;
selecting of the NZP CSI-RS resource for channel state information (CSI) calculation and reporting from the UE;
reporting beam index indicating the selected NZP CSI-RS resource and associated CSI information to the serving cell.

Example 2 may include the method of example 1 or some other example herein, wherein CSI corresponds to aperiodic CSI reporting on physical uplink shared channel (PUSCH)

Example 3 may include the method of example 2 or some other example herein, further comprising: performing joint coding between BI and RI or between BI and CQI/PMI.

Example 4 may include the method of example 3 or some other example herein, further comprising: determining an RI report payload size based on a maximum number of antenna ports across K configured NZP CSI-RS resources and a MIMO capability of the UE.

Example 5 may include the method of example 4 or some other example herein, wherein the unused bits in the RI report are set to fixed values (e.g., 0 or 1).

Example 6 may include the method of example 3 or some other example herein, wherein all configured NZP CSI-RS resources have a same number of antenna ports Nk $\{1,2,4, 8\}$.

Example 7 may include the method of example 2 or some other example herein, wherein the BI is independently encoded from RI and/or CQI/PMI.

Example 8 may include the method of example 7 or some other example herein, wherein BI is reported on one or more same SC-FDMA symbols regardless whether the RI report is present or not.

Example 9 may include the method of example 7 or some other example herein, wherein BI is reported on SC-FDMA symbols of the RI report if all NZP CSI-RS resources have 1 CSI-RS antenna port.

Example 10 may include the method of example 7 or some other example herein, wherein a channel coding procedure for the BI is a same channel coding procedure as a channel coding procedures of the RI for different payload sizes.

Example 11 may include the method of example 7 or some other example herein, wherein a new parameter IBI is used to control the amount of the coded bits QBI for the BI report.

Example 12 may include the method of example 11 or some other example herein, the parameter IBI is higher layer configured.

Example 13 may include the method of example 11 or some other example herein, is determined from the IRI.

Example 14 may include the method of example 13 or some other example herein, a fixed relation between IRI and IBI offsets can be established using IBI=min(12,IRI+Δ), where Δ is some integer value fixed in the specification (e.g. Δ=1).

Example 15 may include the method of example 1 or some other example herein, wherein CSI corresponds to periodic CSI reporting on physical uplink control channel (PUCCH)

Example 16 may include the method of example 15 or some other example herein, wherein the payload size for RI is determined based on the maximum number of antenna ports across all NZP CSI-RS resources and MIMO UE capability.

Example 17 may include the method of example 15 or some other example herein, wherein RI-Config-Index is configured regardless of the number of antenna ports on NZP CSI-RS resources.

Example 18 may include the method of example 17 or some other example herein, wherein RI is not reported if the number of antenna ports on NZP CSI-RS is 1.

Example 19 may include the method of example 15 or some other example herein, wherein the calculation of RI and CQI/PMI conditioned on the last reported BI, in the absence of a last reported BI the UE conducts the RI and CQI/PMI calculation conditioned on the lowest possible BI or NZP CSI-RS value configured for a given CSI process.

Example 20 may include the method of example 15 or some other example herein, wherein the calculation of RI and CQI/PMI conditioned on the last reported BI, in the absence of a last reported BI the UE conducts the RI and CQI/PMI calculation conditioned on the highest possible BI or NZP CSI-RS value configured for a given CSI process.

Example 21 may include the method of example 15 or some other example herein, wherein for CSI process and RI-reference CSI process, all configured NZP CSI-RS resources f should have the same number of NZP CSI-RS resource antenna ports and the same set of restricted RIs.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, and/or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 27 may include a method of communicating in a wireless network as shown and described herein.

Example 28 may include a system for providing wireless communication as shown and described herein.

Example 29 may include a device for providing wireless communication as shown and described herein.

Further embodiments are also provided according to the following numbered clauses:

Clause 1. An apparatus for supporting a user equipment (UE) in reporting of a selection of a Non-Zero Power (NZP) Channel State Information Reference Signal (CSI-RS) resource to an eNodeB (eNB) supporting Full Dimension Multiple Input Multiple Output (FD-MIMO) communication, the apparatus comprising circuitry to: process CSI-RS signals received at an antenna of the UE from the eNB of a serving cell of the UE based on a CSI-RS resource configuration for the UE signaled from the eNB in which two or more NZP CSI-RS resources are configured for the UE and in which each NZP CSI-RS resource is associated with a unique NZP CSI-RS Resource Indication (CRI) on a given serving cell; select an NZP CSI-RS resource for channel state information (CSI) calculation and reporting to the eNB based on the processing of the received CSI-RS signals; and report a CRI and a CSI of the selected NZP CSI-RS resource to the eNB of the serving cell of the UE based on a CRI reporting configuration of the UE signaled from the eNB.

Clause 2. The apparatus of clause 1, comprising circuitry to configure the CSI-RS resource configuration of the UE for processing signals from two or more NZP CSI-RS with Nk={1,2,4,8} antenna ports at the UE, based on CSI-RS configuration parameters signaled from the eNB of the serving cell of the UE.

Clause 3. The apparatus of clause 1 or 2, comprising circuitry to configure the CRI reporting configuration of the UE for aperiodic reporting of the CRI and CSI on physical uplink shared channel (PUSCH) based on CRI reporting configuration parameters signaled from the eNB.

Clause 4. The apparatus of clause 3, comprising circuitry to configure the UE to encode the CRI report jointly with a rank index (RI) report or with a channel quality indicator (CQI) report/precoding matrix indicator (PMI) report.

Clause 5. The apparatus of clause 4, comprising circuitry to configure the UE to set a payload size of a rank index (RI) report based on a maximum number of antenna ports (Nk) across K configured NZP CSI-RS resources and a MIMO capability of the UE.

Clause 6. The apparatus of clause 5, comprising circuitry to configure the UE to set unused bits in an RI report to fixed values.

Clause 7. The apparatus of clause 3, comprising circuitry to configure the UE to encode the CRI report independently of a rank index (RI) report and/or a channel quality indicator (CQI) report/precoding matrix indicator (PMI) report.

Clause 8. The apparatus of clause 7, comprising circuitry to configure the UE to report the CRI on one or more same SC-FDMA symbols regardless of whether or not the RI report is present.

Clause 9. The apparatus of clause 7, comprising circuitry to configure the UE to report the CRI on SC-FDMA symbols of the RI report if all NZP CSI-RS resources configured for the UE have a single CSI-RS antenna port.

Clause 10. The apparatus of clause 7, comprising circuitry to configure the UE to perform a same channel coding procedure for the CRI as a channel coding procedure of the RI for different payload sizes.

Clause 11. The apparatus of any preceding clause, comprising circuitry to configure the CRI reporting configuration of the UE for periodic reporting of the CRI and CSI on physical uplink control channel (PUCCH) based on CRI reporting configuration parameters signaled from the eNB.

Clause 12. The apparatus of clause 11, comprising circuitry to configure the CRI reporting configuration of the UE to set a CRI reporting periodicity and subframe offset based on an RI report configuration and periodicity and CRI reporting configuration parameters signaled from the eNB.

Clause 13. The apparatus of clause 11 or 12, comprising circuitry to configure the UE to set a payload size of a rank index (RI) report based on a maximum number of antenna ports (Nk) across K configured NZP CSI-RS resources and a MIMO capability of the UE.

Clause 14. The apparatus of clause 11, 12 or 13, comprising circuitry to configure the RI-Config-Index of the UE regardless of the number of antenna ports on the configured NZP CSI-RS resources.

Clause 15. The apparatus of clause 14, comprising circuitry to cause the UE to not report the RI if the number of antenna ports on NZP CSI-RS is 1.

Clause 16. The apparatus of any of clauses 11 to 15, comprising circuitry to cause the UE to perform RI and CQI/PMI calculation conditioned on the last reported CRI, and, in the absence of a last reported BI to cause the UE to perform the RI and CQI/PMI calculation conditioned on the lowest possible CRI value configured for a given CSI process.

Clause 17. The apparatus of any of clauses 11 to 16, comprising circuitry to cause the UE, for a CSI process and an RI-reference CSI process, to check that the NZP CSI-RS resource configuration for all configured NZP CSI-RS resources of the CSI process and the RI-reference CSI process have the same number Nk of NZP CSI-RS resource antenna ports and the same set of restricted RIs, said NZP CSI-RS resource configuration being based on CSI-RS configuration parameters signaled from the eNB of the serving cell of the UE.

Clause 18. An apparatus for supporting a user equipment (UE) in reporting of a selection of a Non-Zero Power (NZP) Channel State Information Reference Signal (CSI-RS) resource to an eNodeB (eNB) supporting Full Dimension Multiple Input Multiple Output (FD-MIMO) communication, the apparatus comprising circuitry to:
- select an NZP CSI-RS resource for channel state information (CSI) calculation and reporting to the eNB based on processed CSI-RS signals received at an antenna of the UE from the eNB of a serving cell of the UE based on a CSI-RS resource configuration for the UE signaled from the eNB in which two or more NZP CSI-RS resources are configured for the UE and in which each NZP CSI-RS resource is associated with a unique NZP CSI-RS Resource Indication (CRI) on a given serving cell;
- configure the UE to set a payload size of a rank index (RI) report based on a maximum number of antenna ports (Nk) across K configured NZP CSI-RS resources and a MIMO capability of the UE; and
- report a CRI and a CSI of the selected NZP CSI-RS resource to the eNB of the serving cell of the UE based on a CRI reporting configuration of the UE signaled from the eNB.

Clause 19. A user equipment (UE) comprising apparatus as claused in any of clauses 1 to 18.

Clause 20. Apparatus for supporting an eNodeB (eNB) supporting Full Dimension Multiple Input Multiple Output (FD-MIMO) communication and reporting to the eNB by a UE of a selection by the UE of a Non-Zero Power (NZP) Channel State Information Reference Signal (CSI-RS) beam transmitted by the eNB, the eNB comprising circuitry to:
- generating UE CSI-RS configuration parameters for signaling to the UE for processing signals from two or more NZP CSI-RS with Nk={1,2,4,8} antenna ports at the UE, wherein each NZP CSI-RS resource is associated with a unique NZP CSI-RS Resource Indication (CRI) on the serving cell of the eNB;
- configure for signaling to the UE CRI reporting configuration parameters for the UE to configure the UE for reporting the CRI in an uplink physical channel;
- process signals received at an antenna of the eNB in the uplink physical channel from the UE based on the CRI reporting parameters to recover a CRI report; and
- identify a CSI-RS resource selected by the UE based on the recovered CRI report.

Clause 21. The apparatus of clause 20, comprising circuitry to decode a CRI report and a CSI report based on a payload size of a rank index (RI) report being set based on a maximum number of antenna ports (Nk) across K configured NZP CSI-RS resources and a reported MIMO capability of the UE.

Clause 22. The apparatus of clause 21, further comprising circuitry to configure the CRI reporting configuration parameter for the UE for aperiodic reporting of the CRI on physical uplink shared channel (PUSCH), and to decode a CRI report joint coded with the RI report or a channel quality indicator (CQI) report/precoding matrix indicator (PMI) report based on the payload size set for the RI report.

Clause 23. The apparatus of clause 22, further comprising circuitry to decode the CRI report joint coded with the RI report or a channel quality indicator (CQI) report/precoding matrix indicator (PMI) report based on unused bits in an RI report being set to fixed values.

Clause 24. The apparatus of any of clauses 20 to 23, further comprising circuitry to configure the CRI reporting configuration parameter for the UE for periodic reporting of the CRI on physical uplink control channel (PUCCH), and to configure the eNB to signal to the UE to configure the RI-Config-Index of the UE regardless of the number of antenna ports on the configured NZP CSI-RS resources.

Clause 25. An eNB comprising apparatus as claused in any of clauses 20 to 24.

Clause 26. A method for supporting a user equipment (UE) in reporting of a selection of a Non-Zero Power (NZP) Channel State Information Reference Signal (CSI-RS) resource to an eNodeB (eNB) supporting Full Dimension Multiple Input Multiple Output (FD-MIMO) communication, the method comprising:
- processing CSI-RS signals received at an antenna of the UE from the eNB of a serving cell of the UE based on a CSI-RS resource configuration for the UE signaled from the eNB in which two or more NZP CSI-RS resources are configured for the UE and in which each NZP CSI-RS resource is associated with a unique NZP CSI-RS Resource Indication (CRI) on a given serving cell;
- selecting an NZP CSI-RS resource for channel state information (CSI) calculation and reporting to the eNB based on the processing of the received CSI-RS signals; and
- reporting a CRI and a CSI of the selected NZP CSI-RS resource to the eNB of the serving cell of the UE based on a CRI reporting configuration of the UE signaled from the eNB.

Clause 27. The method of clause 26, further comprising configuring the CSI-RS resource configuration of the UE for processing signals from two or more NZP CSI-RS with Nk={1,2,4,8} antenna ports at the UE, based on CSI-RS configuration parameters signaled from the eNB of the serving cell of the UE.

Clause 28. The method of clause 26 or 27, further comprising aperiodically reporting the CRI and CSI on physical uplink shared channel (PUSCH) based on CRI reporting configuration parameters signaled from the eNB.

Clause 29. The method of clause 28, further comprising encoding the CRI report jointly with a rank index (RI) report or with a channel quality indicator (CQI) report/precoding matrix indicator (PMI) report.

Clause 30. The method of clause 29, further comprising setting a payload size of a rank index (RI) report based on a maximum number of antenna ports (Nk) across K configured NZP CSI-RS resources and a MIMO capability of the UE.

Clause 31. The method of clause 30, further comprising setting unused bits in an RI report to fixed values.

Clause 32. The method of clause 28, further comprising encoding the CRI report independently of a rank index (RI) report and/or a channel quality indicator (CQI) report/precoding matrix indicator (PMI) report.

Clause 33. The method of clause 32, further comprising reporting the CRI on one or more same SC-FDMA symbols regardless of whether or not the RI report is present.

Clause 34. The method of clause 32, further comprising reporting the CRI on SC-FDMA symbols of the RI report if all NZP CSI-RS resources configured for the UE have a single CSI-RS antenna port.

Clause 35. The method of clause 32, further comprising performing a same channel coding procedure for the CRI as a channel coding procedure of the RI for different payload sizes.

Clause 36. The method of any of clauses 26 to 25, further comprising periodically reporting the CRI and CSI on physical uplink control channel (PUCCH) based on CRI reporting configuration parameters signaled from the eNB.

Clause 37. The method of clause 36, further comprising setting a CRI reporting periodicity and subframe offset based on an RI report configuration and periodicity and CRI reporting configuration parameters signaled from the eNB.

Clause 38. The method of clause 36 or 37, further comprising setting a payload size of a rank index (RI) report based on a maximum number of antenna ports (Nk) across K configured NZP CSI-RS resources and a MIMO capability of the UE.

Clause 39. The method of clause 36, 37 or 38, further comprising configuring the RI-Config-Index of the UE regardless of the number of antenna ports on the configured NZP CSI-RS resources.

Clause 40. The method of clause 39, further comprising not reporting the RI if the number of antenna ports on NZP CSI-RS is 1.

Clause 41. The method of any of clauses 36 to 40, further comprising performing RI and CQI/PMI calculation conditioned on the last reported CRI, and, in the absence of a last reported BI, performing the RI and CQI/PMI calculation conditioned on the lowest possible CRI value configured for a given CSI process.

Clause 42. The method of any of clauses 36 to 41, further comprising, for a CSI process and an RI-reference CSI process, checking that the NZP CSI-RS resource configuration for all configured NZP CSI-RS resources of the CSI process and the RI-reference CSI process have the same number Nk of NZP CSI-RS resource antenna ports and the same set of restricted RIs, said NZP CSI-RS resource configuration being based on CSI-RS configuration parameters signaled from the eNB of the serving cell of the UE.

Clause 43. A method for supporting a user equipment (UE) in reporting of a selection of a Non-Zero Power (NZP) Channel State Information Reference Signal (CSI-RS) resource to an eNodeB (eNB) supporting Full Dimension Multiple Input Multiple Output (FD-MIMO) communication, the method comprising:
  selecting an NZP CSI-RS resource for channel state information (CSI) calculation and reporting to the eNB based on processed CSI-RS signals received at an antenna of the UE from the eNB of a serving cell of the UE based on a CSI-RS resource configuration for the UE signaled from the eNB in which two or more NZP CSI-RS resources are configured for the UE and in which each NZP CSI-RS resource is associated with a unique NZP CSI-RS Resource Indication (CRI) on a given serving cell;
  setting a payload size of a rank index (RI) report based on a maximum number of antenna ports (Nk) across K configured NZP CSI-RS resources and a MIMO capability of the UE; and
  reporting a CRI and a CSI of the selected NZP CSI-RS resource to the eNB of the serving cell of the UE based on a CRI reporting configuration of the UE signaled from the eNB.

Clause 44. A method for supporting an eNodeB (eNB) supporting Full Dimension Multiple Input Multiple Output (FD-MIMO) communication and reporting to the eNB by a UE of a selection by the UE of a Non-Zero Power (NZP) Channel State Information Reference Signal (CSI-RS) beam transmitted by the eNB, the method comprising:
  generating UE CSI-RS configuration parameters for signaling to the UE for processing signals from two or more NZP CSI-RS with Nk={1,2,4,8} antenna ports at the UE, wherein each NZP CSI-RS resource is associated with a unique NZP CSI-RS Resource Indication (CRI) on the serving cell of the eNB;
  configuring for signaling to the UE CRI reporting configuration parameters for the UE to configure the UE for reporting the CRI in an uplink physical channel;
  processing signals received at an antenna of the eNB in the uplink physical channel from the UE based on the CRI reporting parameters to recover a CRI report; and
  identifying a CSI-RS resource selected by the UE based on the recovered CRI report.

Clause 45. The method of clause 44, further comprising decoding a CRI report and a CSI report based on a payload size of a rank index (RI) report being set based on a maximum number of antenna ports (Nk) across K configured NZP CSI-RS resources and a reported MIMO capability of the UE.

Clause 46. The method of clause 45, further comprising configuring the CRI reporting configuration parameter for the UE for aperiodic reporting of the CRI on physical uplink shared channel (PUSCH), and decoding a CRI report joint coded with the RI report or a channel quality indicator (CQI) report/precoding matrix indicator (PMI) report based on the payload size set for the RI report.

Clause 47. The method of clause 46, further comprising decoding the CRI report joint coded with the RI report or a channel quality indicator (CQI) report/precoding matrix indicator (PMI) report based on unused bits in an RI report being set to fixed values.

Clause 48. The method of any of clauses 44 to 47, further comprising configuring the CRI reporting configuration parameter for the UE for periodic reporting of the CRI on physical uplink control channel (PUCCH), and configuring the eNB to signal to the UE to configure the RI-Config-Index of the UE regardless of the number of antenna ports on the configured NZP CSI-RS resources.

Clause 49. An apparatus comprising means for implementing a method of any of clauses 26 to 49.

Clause 50. Machine executable instructions arranged, when executed by at least one processor or circuitry, for implementing a method of any of clauses 26 to 48.

Clause 51. Machine readable storage storing machine executable instructions of clause 50.

Clause 52. An eNB, UE, device, apparatus or system as described or claimed herein, and/or as expressed in any and all example clauses, further comprising at least one of:
- a display, such as, for example, a touch sensitive display,
- an input device, such as, for example, one or more than one of a button, a key pad, an audio input, a video input, and/or
- an output device such as, for example, an audio output, a video output, a haptic device taken jointly and severally in any and all permutations.

Clause 53. An apparatus, UE, method, eNodeB substantially as described herein with reference to and/or as illustrated in any one or more of the accompanying drawings.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

As used in this specification, the formulation "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order.

It will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

The invention claimed is:

1. One or more non-transitory, computer-readable media having instructions that, when executed by one or more processors, cause a a user equipment (UE) to:
  process Channel State Information Reference Signal (CSI-RS) signals received at an antenna of the UE from an eNodeB (eNB), which supports Full Dimension Multiple Input Multiple Output (FD-MIMO) communication, of a serving cell of the UE based on a CSI-RS resource configuration for the UE signaled from the eNB in which two or more Non-Zero Power (NZP) CSI-RS resources are configured for the UE and in which each NZP CSI-RS resource is associated with a unique NZP CSI-RS Resource Indication (CRI) on a given serving cell;
  select an NZP CSI-RS resource for channel state information (CSI) calculation and reporting to the eNB based on the processing of the received CSI-RS signals; and
  report a CRI and a CSI of the selected NZP CSI-RS resource to the eNB of the serving cell of the UE based on a CRI reporting configuration of the UE signaled from the eNB.

2. The one or more non-transitory, computer-readable media of claim 1, wherein the instructions, when executed, further cause the UE to configure the CSI-RS resource configuration of the UE for processing signals from two or more NZP CSI-RS with Nk={1,2,4,8} antenna ports at the UE, based on CSI-RS configuration parameters signaled from the eNB of the serving cell of the UE.

3. The one or more non-transitory, computer-readable media of claim 1, wherein the instructions, when executed, further cause the UE to configure the CRI reporting configuration of the UE for aperiodic reporting of the CRI and CSI on physical uplink shared channel (PUSCH) based on CRI reporting configuration parameters signaled from the eNB.

4. The one or more non-transitory, computer-readable media of claim 3, wherein the instructions, when executed, further cause the UE to encode the CRI report jointly with a rank index (RI) report or with a channel quality indicator (CQI) report/precoding matrix indicator (PMI) report.

5. The one or more non-transitory, computer-readable media of claim 4, wherein the instructions, when executed, further cause the UE to set a payload size of a rank index (RI) report based on a maximum number of antenna ports (Nk) across K configured NZP CSI-RS resources and a MIMO capability of the UE.

6. The one or more non-transitory, computer-readable media of claim 5, wherein the instructions, when executed, further cause the UE to set unused bits in an RI report to fixed values.

7. The one or more non-transitory, computer-readable media of claim 3, wherein the instructions, when executed, further cause the UE to encode the CRI report independently of a rank index (RI) report and/or a channel quality indicator (CQI) report/precoding matrix indicator (PMI) report.

8. The one or more non-transitory, computer-readable media of claim 7, wherein the instructions, when executed, further cause the UE to report the CRI on one or more same single carrier frequency division multiple access (SC-FDMA) symbols regardless of whether or not the RI report is present.

9. The one or more non-transitory, computer-readable media of claim 7, wherein the instructions, when executed, further cause the UE to report the CRI on single carrier frequency division multiple access (SC-FDMA) symbols of the RI report if all NZP CSI-RS resources configured for the UE have a single CSI-RS antenna port.

10. The one or more non-transitory, computer-readable media of claim 7, wherein the instructions, when executed, further cause the UE to perform a same channel coding procedure for the CRI as a channel coding procedure of the RI for different payload sizes.

11. The one or more non-transitory, computer-readable media of claim 1, wherein the instructions, when executed, further cause the UE to configure the CRI reporting configuration of the UE for periodic reporting of the CRI and CSI on physical uplink control channel (PUCCH) based on CRI reporting configuration parameters signaled from the eNB.

12. The one or more non-transitory, computer-readable media of claim 11, wherein the instructions, when executed, further cause the UE to configure the CRI reporting configuration of the UE to set a CRI reporting periodicity and subframe offset based on an RI report configuration and periodicity and CRI reporting configuration parameters signaled from the eNB.

13. The one or more non-transitory, computer-readable media of claim 11, wherein the instructions, when executed, further cause the UE to set a payload size of a rank index (RI) report based on a maximum number of antenna ports (Nk) across K configured NZP CSI-RS resources and a MIMO capability of the UE.

14. The one or more non-transitory, computer-readable media of claim 11, wherein the instructions, when executed, further cause the UE to configure an RI-Config-Index of the UE regardless of the number of antenna ports on the configured NZP CSI-RS resources.

15. The one or more non-transitory, computer-readable media of claim 14, wherein the instructions, when executed, further cause the UE to not report the RI if the number of antenna ports on NZP CSI-RS is 1.

16. The one or more non-transitory, computer-readable media of claim 11, wherein the instructions, when executed, further cause the UE to perform RI and CQI/PMI calculation conditioned on the last reported CRI, and, in the absence of a last reported beam index (BI) to cause the UE to perform the RI and CQI/PMI calculation conditioned on the lowest possible CRI value configured for a given CSI process.

17. The one or more non-transitory, computer-readable media of claim 11, wherein the instructions, when executed, further cause the UE, for a CSI process and an RI-reference CSI process, to check that the NZP CSI-RS resource configuration for all configured NZP CSI-RS resources of the CSI process and the RI-reference CSI process have the same number Nk of NZP CSI-RS resource antenna ports and the same set of restricted RIs, said NZP CSI-RS resource configuration being based on CSI-RS configuration parameters signaled from the eNB of the serving cell of the UE.

18. One or more non-transitory, computer-readable media having instructions that, when executed by one or more processors, cause an eNodeB (eNB) to:
generate user equipment (UE) Channel State Information Reference Signal (CSI-RS) configuration parameters for signaling to the UE to configure the UE for processing signals from two or more Non-Zero Power (NZP) CSI-RS with Nk={1,2,4,8} antenna ports at the UE, wherein each NZP CSI-RS resource is associated with a unique NZP CSI-RS Resource Indication (CRI) on a serving cell of the eNB;
configure, for signaling to the UE, CRI reporting configuration parameters for the UE to configure the UE for reporting the CRI in an uplink physical channel;
process signals received at an antenna of the eNB in the uplink physical channel from the UE based on the CRI reporting configuration parameters to recover a CRI report; and
identify a CSI-RS resource selected by the UE based on the recovered CRI report.

19. The one or more non-transitory, computer-readable media of claim 18, wherein the instructions, when executed, further cause the eNB to decode a CRI report and a CSI report based on a payload size of a rank index (RI) report being set based on a maximum number of antenna ports (Nk) across K configured NZP CSI-RS resources and a reported MIMO capability of the UE.

20. The one or more non-transitory, computer-readable media of claim 19, wherein the instructions, when executed, further cause the eNB to configure the CRI reporting configuration parameter for the UE for aperiodic reporting of the CRI on physical uplink shared channel (PUSCH), and to decode a CRI report joint coded with the RI report or a channel quality indicator (CQI) report/precoding matrix indicator (PMI) report based on the payload size set for the RI report.

21. The one or more non-transitory, computer-readable media of claim 20, wherein the instructions, when executed, further cause the eNB to decode the CRI report joint coded with the RI report or a channel quality indicator (CQI) report/precoding matrix indicator (PMI) report based on unused bits in an RI report being set to fixed values.

22. The one or more non-transitory, computer-readable media of claim 18, wherein the instructions, when executed, further cause the eNB to configure the CRI reporting configuration parameter for the UE for periodic reporting of the CRI on physical uplink control channel (PUCCH), and to configure an eNB to signal to the UE to configure the RI-Config-Index of the UE regardless of the number of antenna ports on the configured NZP CSI-RS resources.

23. An apparatus comprising:
processing circuitry to: process Channel State Information Reference Signal (CSI-RS), signals received at an antenna of a user equipment (UE) from an eNodeB (eNB), which supports Full Dimension Multiple Input Multiple Output (FD-MIMO), of a serving cell of the UE based on a CSI-RS resource configuration for the UE signaled from the eNB in which two or more Non-Zero Power (NZP) CSI-RS resources are configured for the UE and in which each NZP CSI-RS resource is associated with a unique NZP CSI-RS Resource Indication (CRI) on a given serving cell; and
select an NZP CSI-RS resource for Channel State Information (CSI) calculation and reporting to the eNB based on the processing of the received CSI-RS signals; and
radio frequency circuitry to report a CRI and a CSI of the selected NZP CSI-RS resource to the eNB of the serving cell of the UE based on a CRI reporting configuration of the UE signaled from the eNB.

24. An apparatus comprising:
processing circuitry to:
configure, for signaling to a user equipment (UE), Channel State Information Reference Signal (CSI-RS) configuration parameters for the UE to configure the UE for processing signals from two or more Non-Zero Power (NZP) CSI-RS with Nk={1,2,4,8} antenna ports at the UE, wherein each NZP CSI-RS resource is associated with a unique NZP CSI-RS Resource Indication (CRI) on a serving cell of an eNodeB (eNB) that supports Full Dimension Multiple Input Multiple Output (FD-MIMO) communication;
configure, for signaling to the UE, CRI reporting configuration parameters for the UE to configure the UE for reporting the CRI in an uplink physical channel;
wireless transmission circuitry to signal the CSI-RS configuration parameters and the CRI reporting configuration parameters to the UE;
wherein the processing circuitry is further to process signals received at an antenna of the eNB in the uplink physical channel from the UE based on the CRI reporting configuration parameters to recover a CRI report; and identify a CSI-RS resource selected by the UE based on the recovered CRI report.

* * * * *